United States Patent [19]
Gilmore et al.

[11] 3,832,624
[45] Aug. 27, 1974

[54] GROUP BLANKING CONTROL FOR CYCLOCONVERTER

[75] Inventors: Thomas P. Gilmore, Wauwatosa; William L. Ringland, Greendale; Allois F. Geiersbach, Milwaukee, all of Wis.

[73] Assignee: Allis-Chalmers Corporation, Milwaukee, Wis.

[22] Filed: Sept. 6, 1973

[21] Appl. No.: 394,979

[52] U.S. Cl. ............... 321/66, 318/171, 318/231, 321/13, 321/69 R
[51] Int. Cl. ............... H02m 5/30, H02p
[58] Field of Search ........... 318/171, 227, 231, 257; 321/13, 60, 65, 66, 69 R

[56] References Cited
UNITED STATES PATENTS

| | | | |
|---|---|---|---|
| 3,467,850 | 9/1969 | Christiansen et al. | 321/13 |
| 3,636,423 | 1/1972 | Jenkins | 318/227 |
| 3,654,541 | 4/1972 | Kelly et al. | 318/257 |
| 3,678,369 | 7/1972 | Splatt | 321/69 R |
| 3,584,276 | 6/1971 | Ringland et al. | 318/171 |

FOREIGN PATENTS OR APPLICATIONS

| | | | |
|---|---|---|---|
| 237,989 | 9/1969 | U.S.S.R. | 321/66 |
| 188,570 | 9/1966 | U.S.S.R. | 321/69 |

Primary Examiner—William H. Beha, Jr.
Attorney, Agent, or Firm—Lee H. Kaiser

[57] ABSTRACT

A cycloconverter has a positive current group of SCR's and a negative current group of SCR's connected in parallel between a polyphase supply course and an output lead with the output side of the positive and negative groups connected directly together. Gating signals are sequentially derived for the SCR's of the positive and negative groups, and gating signals to the positive and negative groups are blanked alternately when the current in the output lead is negative and positive respectively. The gating signal deriving means are disabled when the output current decreases to a predetermined triggering level in crossing the zero axis in either direction, and gating signals are applied to the last conducting SCR and to the SCR of the nonconducting group connected to the same phase of the supply source so that intergroup circulating currents are prevented. When the output current increases beyond the triggering level, the last conducting SCR is commutated and the gating signal deriving means is enabled after a sufficient time delay to allow said last conducting SCR to commutate.

35 Claims, 16 Drawing Figures

GROUP BLANKING CONTROL FOR CYCLOCONVERTER

This invention relates to cycloconverters and in particular to a control for alternately blanking positive and negative groups of SCR's of a cycloconverter.

BACKGROUND OF THE INVENTION

Cycloconverters conventionally employ chokes, or center-tapped reactors between the output sides of positive and negative SCR group to limit intergroup circulating currents, and such center-tapped reactors are bulky and heavy and represent a significant portion of the cost of the cycloconverter. Further, cycloconverters employing such center-tapped reactors to limit intergroup circulating current are usually designed to provide equal average output voltages from the positive and negative groups over a cycle of the supply source, and this criterion of equal average voltages from positive and negative SCR groups materially limits the maximum firing angles that can be employed and necessitates use of SCR's having fast turn-off time which are relatively expensive. Such limitation of firing angles for the SCR's requires that a generator energizing the cycloconverter be of higher voltage rating to provide a given output voltage from the cycloconverter. The reactors also limit the allowable commutating inductance of a generator energizing the cycloconverter and thus require that the generator be of greater size and weight. Still further, center-tapped reactors between positive and negative SCR groups of a cycloconverter energizing a synchronous motor require that the gating circuits for the SCR's be of the sustained firing type rather than of the pulse type.

Alternating group blanking circuits for cycloconverters are known wherein gating signals are only supplied to one SCR group at a time so that the positive and negative groups alternately supply a half cycle of the AC output current. Such alternating group blanking circuit may sense the current delivered by each SCR group and blank gating signals to the nonconducting group until the last SCR of the conducting group is turned off by natural commutation with alternating group switching timed in accordance with zero current in the AC output. Problems are encountered in such group blanking circuits in that the SCR's of the nonconducting group may be turned on before all SCR's of the conducting group have regained blocking control even though the gating signals thereto are blanked and result in circulating currents between groups.

Multiple, or false zero crossings may occur near the beginning and end of the positive and negative half cycles which cause undesired switching from one current carrying group to the other. Further, transients having current envelopes tangent to or near current zero may occur which turn on a group of the wrong polarity to supply the load so that the output current will remain at zero for a time dependent upon the RC time constant of the load and produce flats, or portions of zero current in the output current wave. In order to overcome these disadvantages, certain blanking circuits introduce a time delay between the signal blanking a conducting group and the signal unblanking a nonconducting group, while other blanking circuits are responsive to zero load current to make the positive and negative groups available in alternation to the load until one of the groups supplies the load current required. Known group blanking circuits which only permit one group to be on at a time and introduce a time delay between the signal blanking a conducting group and the signal unblanking the nonconductive group are not suitable for energizing a synchronous motor which may operate above base speed for the reason that an excessive overvoltage may occur at the motor terminals of the stator winding if the circuit is allowed to open even during zero current.

SUMMARY OF THE INVENTION

The above and other disadvantages of the prior art are overcome in accordance with the invention by providing a cycloconverter with positive and negative groups of SCR's connected in parallel between a polyphase voltage supply source and an output lead with the output sides of the positive and negative groups connected directly together to eliminate the heavy, expensive and bulky center-tapped reactors used in prior art circuits to limit intergroup circulatory currents. Gating signal deriving means sequentially generate firing signals for the SCR's of the positive and negative SCR groups, intergroup blanking circuit means alternately block gating signals to the positive and negative groups when the cycloconverter output current is negative and positive respectively so that each group alternately provides a half cycle of the AC output current, and means responsive to output current decreasing to a predetermined triggering level when crossing the zero axis in either the positive-going or negative-going direction disable the means for sequentially deriving gating signals and supply gating signals to the last conducting SCR of the conducting group and to the SCR of the nonconducting group connected to the same phase of the supply source so that the two SCR's connected to the same source phase are conducting when the output current crosses the zero axis to thereby prevent intergroup circulatory currents and to obviate the need of center-tapped reactors. Means responsive to the output current subsequently exceeding the triggering level remove the gating signal from the last conducting SCR of the previously conducting group so that it commutates and also enable the sequential gating signal deriving means, but only after a sufficient time delay to permit the SCR to commutate.

OBJECTS OF THE INVENTION

It is an object of the invention to provide an improved group blanking control for a cycloconverter which overcomes the above disadvantages of the prior art and obviates the necessity of center-tapped reactors between the positive and negative groups of SCR's.

A further object of the invention is to provide an intergroup blanking circuit for a cycloconverter which permits increase in maximum SCR firing angles in comparison to prior art cycloconverters using center-tapped reactors to limit intergroup circulatory current. Another object is to provide such an intergroup blanking circuit which permits use of a supply generator of reduced voltages, weight and cost to obtain a given cycloconverter output voltage in comparison to that required for a cycloconverter employing such center-tapped reactors.

It is a further object of the invention to provide such an improved group blanking control which maintains at least one SCR conducting at all times even at current zero so that the load circuit is never open and the cycloconverter may safely energize a synchronous motor without danger of excessive voltage being developed at the motor terminals.

Another object of the invention is to provide such an improved group blanking circuit for a cycloconverter which eliminates the flat spots in the cyclconverter output current wave which often occurred with prior art circuits that provided a time delay between blanking the conducting group and unblanking the nonconducting group.

DESCRIPTION OF THE DRAWINGS

These and other objects and advantages of the invention will be more readily apparent from the following detailed description when considered in conjunction with the accompanying drawings wherein.

DETAILED DESCRIPTION

The invention will be described as incorporated in the adjustable speed synchronous motor control system disclosed in U.S. Pat. No. 3,584,276 to W. L. Ringland et al. having the same assignee as this invention and partially illustrated schematically in FIG. 1 wherein a three-phase inductor type synchronous motor 10 operatively connected to a vehicle wheel (not shown) is energized from a high frequency three-phase electric generator 11 driven by a diesel (not shown) on the vehicle through a cycloconverter 12. Cycloconverter 12 converts three-phase, high and constant frequency voltages A, B and C from generator 11 on busses $\phi_A$, $\phi_B$ and $\phi_C$ into three-phase variable and relatively low frequency voltages for energizing stator phase windings X, Y and Z of motor 10. Cycloconverter 12 is shown within a dash-dot line figure and preferably includes eighteen thyristors, or SCR's, arranged in three "sets" 15X, 15Y and 15Z of six SCR's so that each set of six SCR's comprises a full wave rectifier which supplies power to one motor phase stator winding X, Y or Z. Only the set 15X of six thyristors associated with motor phase winding X will be described, the other two sets 15Y and 15Z being similar thereto. The set 15X of six SCR's associated with motor phase winding X comprises a positive current conducting group PX of three SCR's and a negative current conducting group NX of three SCR's shown within a dashed line rectangle with the positive and negative groups PX and NX connected back-to-back with respect to motor phase winding X so that each group alternately provides a half cycle of each full cycle of output current $I_x$ to motor winding X.

Figure 1:
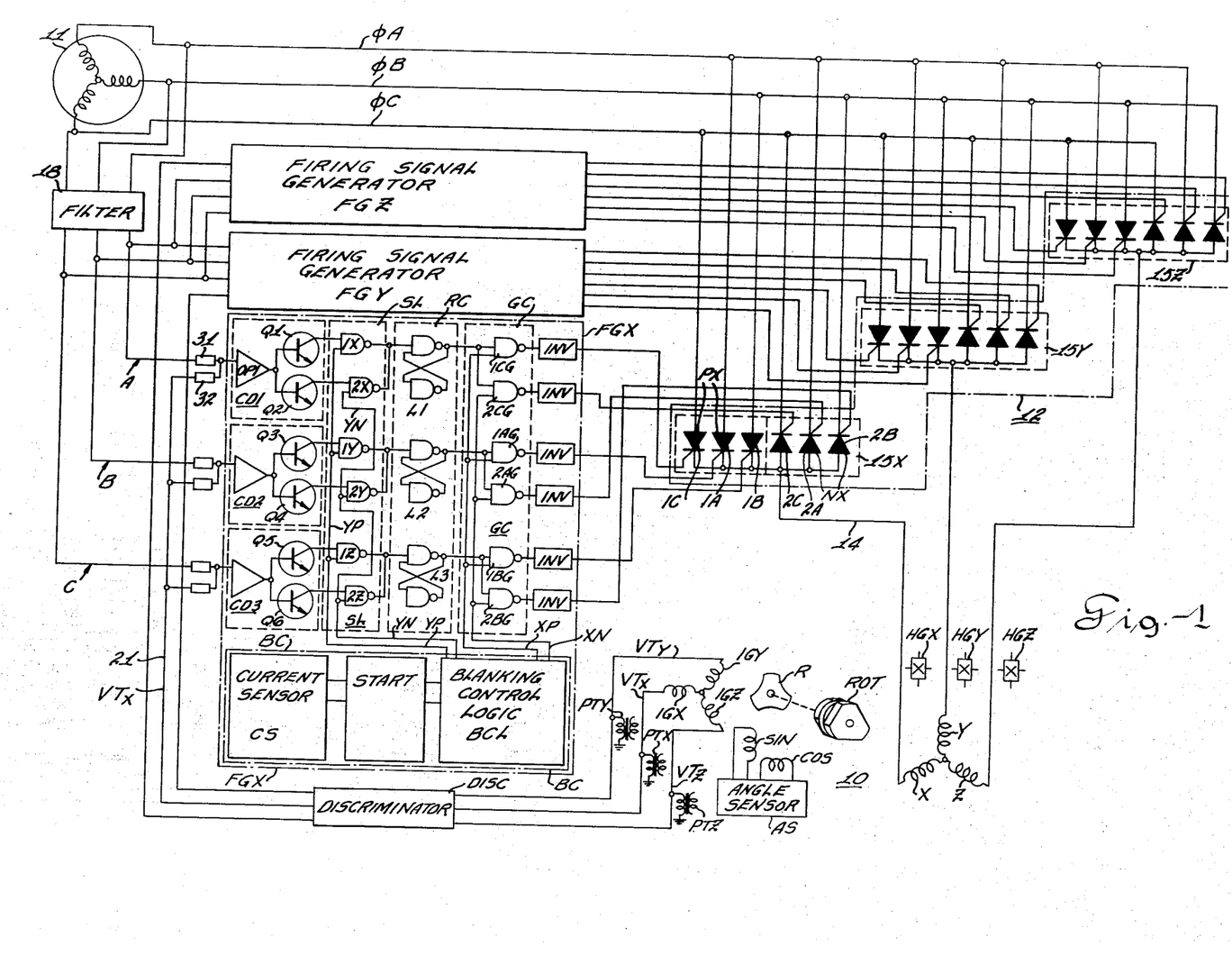
FIG. 1 is a schematic diagram of the variable speed motor control system of U.S. Pat. No. 3,584,276 incorporating therein a block diagram representation of a preferred embodiment of the intergroup blanking control of the invention.

The positive and negative groups PX and NX are often referred to as a pair of ac-dc converters connected in inverse parallel so that currents of both positive and negative polarity can be supplied to the motor phase winding load. It is known in the cycloconverter art that instantaneous voltage differences may exist between positive and negative groups of SCR's, and intergroup circulating currents are prevented in the motor control of aforementioned U.S. Pat. No. 3,584,276 by chokes, or center-tapped reactors employed in the current paths between the groups. Such reactors are heavy, bulky and expensive, and one feature of our invention is that such center-tapped reactors are eliminated and the positive and negative groups such as PX and NX are connected directly together and by a conductor 14 to motor phase winding X.

Positive group pX comprises three thyristors, or SCR's 1A, 1B and 1C having their anodes connected to generator busses $\phi_A$, $\phi_B$ and $\phi_C$, respectively, and their cathodes commoned and connected through lead 14 to motor phase winding X, and negative group NX comprises three SCR's 2A, 2B and 2C having their cathodes connected to generator busses $\phi_A$, $\phi_B$ and $\phi_C$, respectively, and their anodes commoned and connected through lead 14 to motor phase winding X.

In order to selectively vary speed of motor 10, the SCR's 1A, 1B, 1C, 2A, 2B and 2C are gated on, or fired to the conductive state in an appropriate sequence to convert the high frequency three-phase generator voltages A, B, C on busses $\phi_A$, $\phi_B$ and $\phi_C$ into relatively low voltage frequency voltages of variable frequency and magnitude applied to motor stator windings X, Y, Z. Manually operated regulating means such as a foot pedal (not shown) on the vehicle selectively control the magnitude of carrier frequency signals applied to the primary, or energizing, quadrature windings SIN and COS of a vector adder "angle sensor" AS shown in block form and disclosed in aforementioned U.S. Pat. No. 3,584,276, and angle sensor AS vectorially adds the signals applied to energizing windings SIN and COS and induces three-phase resultant voltages $VT_x$, $VT_y$ and $VT_z$ in star-connected three-phase secondary windings 16X, 16Y and 16Z displaced 120 electrical degrees apart, and a ferromagnetic rotor R operatively connected to the motor rotor ROT cyclically modulates the carrier frequency voltages $VT_x$, $VT_y$ and $VT_z$ induced in the three-phase secondary windings 16X, 16Y and 16Z at the frequency of rotation of motor rotor ROT. The three-phase voltages $VT_x$, $VT_y$ and $VT_z$ induced in the angle sensor output windings 16X, 16Y and 16Z pass through a discriminator, or demodulator DISC shown in block form to remove the carrier frequency and are replicas of the desired terminal voltages to be applied to motor rotor phase windings X, Y and Z to obtain the desired motor speed, and the three-phase output voltages $VT_x$, $VT_y$ and $VT_z$ after demodulation control the sequence and firing angles of the SCR's of cycloconverter 12 to regulate the phase and magnitude of the terminal voltage applied to motor stator winding X, Y and Z and thereby control motor speed.

Alternatively signals to be mixed with the generator phase voltages to derive signals for controlling cycloconverter 12 may be derived by a capacitive rotor position sensor for rotor ROT of motor 10 such as disclosed in U.S. Pat. application Ser. No. 253,418 in the name of Frederick A. Stich filed May 15, 1972 and having the same assignee as this invention.

FIRING SIGNAL GENERATORS

Firing signal generators FGX, FGY and FGZ derive gating signals from the thyristor sets 15X, 15Y and 15Z respectively associated with the motor phase windings X, Y and Z. The three firing signal generators are similar, and only firing signal generator FGX for deriving gating signals for the SCR's 1A, 1B and 1C of group PX and 2A, 2B and 2C of group NX will be described. The generator voltages on busses $\phi_A$, $\phi_B$ and $\phi_C$ may pass through a filter 18 to remove any notches therein and restore the fundamental component, and the output busses from filter 18 are given the same designations $\phi_A$, $\phi_B$ and $\phi_C$ as the corresponding input busses to facilitate understanding of the invention. The voltages on the generator buses $\phi_A$, $\phi_B$, and $\phi_C$ are designated A, B and C, respectively.

Figure 3A:
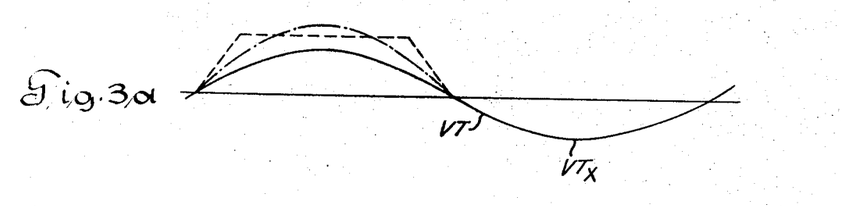
FIG. 3a shows the low frequency output voltage $VT_x$ from angle sensor secondary winding 16X which is the desired cycloconverter output voltage to be applied to motor phase winding X.
Figure 3B:
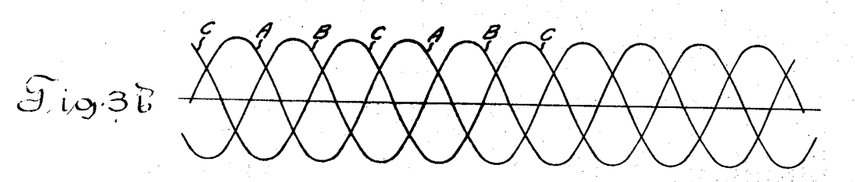
FIG. 3b shows the generator three-phase input voltages A, B, C to the cycloconverter which are mixed with the signal $VT_x$ shown in FIG. 3a to derive sequencing signals to control the gating of the positive and negative group SCR's of the cycloconverter.
Figures 3C, 3D, 3E, 3F:
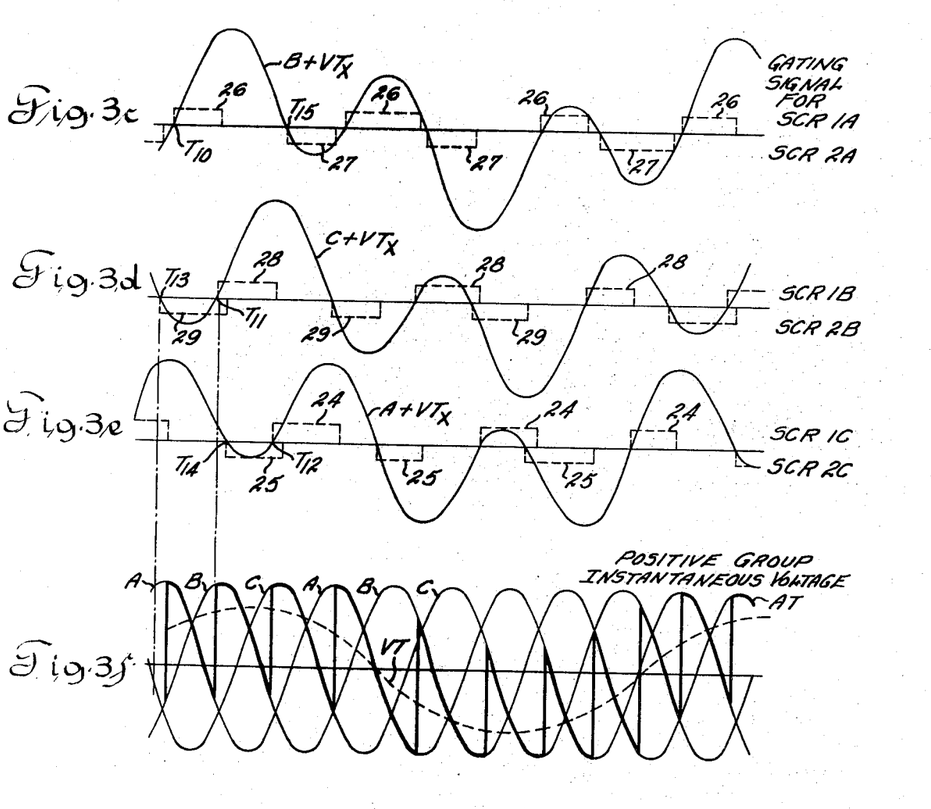
FIGS. 3c, 3d and 3e show the three sequencing signals $B + VT_x$, $C + VT_x$ and $A + VT_x$ generated by mixing the signals in FIGS. 3a and 3b and which respectively control firing the SCR's connected to supply generator phases $\phi_A$, $\phi_B$ and $\phi_C$.

Firing signal generator FGX shown within a dash-dot rectangle in FIG. 1 superimposes the demodulated low frequency output signal $VT_x$ from angle sensor output winding 16X shown in FIG. 3a on the filtered three-phase "references" voltages A, B and C from generator 11 shown in FIG. 3b to derive sequence signals $B+VT_x$, $C+VT_x$ and $A+VT_x$ shown in FIGS. 3c, 3d and 3e, respectively, which control the firing angles of SCR's 1A, 1B, 1C, 2A, 2B and 2C and the sequence in which they are fired.

Firing signal generator FGX includes three crossing detectors CD1, CD2 and CD3 which sense crossing of the zero axis by the sequence signals $A+VT_x$, $B+VT_x$ and $C+VT_x$, respectively. Crossing detector CD1 receives as inputs both the high frequency generator voltage on bus $\phi_A$ (after it passes through filter 18) and the demodulated low frequency angle sensor output voltage $VT_x$ on a lead 21 and mixes them to derive sequence signal $A+VT_x$ and senses positive-going zero crossings of signal $A+VT_x$ to derive gating signal 24 (shown in dotted lines in FIG. 3e) for firing SCR 1C of group PX and negative-going zero crossings of sequence signal $A+VT_x$ to derive gating signal 25 for firing SCR 2C of group NX. Similarly, crossing detector CD2 receives as inputs both the filtered high frequency generator voltage B on bus $\phi_B$ and the demodulated low frequency angle sensor output voltage $VT_x$ on lead 21 and mixes them to derive sequence signals $B+VT_x$ and senses positive-going and negative-going crossings of signal $B+VT_x$ to respectively derive gating signal 26 for SCR 1A of group PX and gating signal 27 for SCR 2A of group NX as shown in FIG. 3c. In a similar manner, crossing detector CD3 receives as inputs both the filtered generator voltage C on bus $\phi_C$ and the demodulator low frequency angle sensor output voltage $VT_x$ on lead 21 and mixes them to derive sequence signal $C+VT_x$ and senses positive going and negative-going zero crossings of signal $C+VT_x$ to respectively derive gating signal 28 for SCR 1B of group PX and gating signal 29 for SCR 2B of group NX as shown in FIG. 3d.

Crossing Detectors

The three crossing detectors CD1, CD2 and CD3 are similar, and only crossing detector CD1 will be described. The filtered generator voltage A on bus $\phi_A$ is applied through a resistance 31 (See FIG. 2) to the inverting input of an operational amplifier OP1, preferably of the integrated circuit type arranged in a bistable Schmitt trigger circuit, and the low frequency demodulated voltage $VT_x$ on lead 21 is applied through a resistance 32 to the same inverting input to thereby mix the two signals A and $VT_x$ so that such inverting input sees sequence signal $A+VT_x$. When sequence signal $A+VT_x$ crosses the zero axis in a positive-going direction, the polarity of the output voltage of amplifier OP1 goes from positive to negative and is coupled through a differentiating circuit comprising a resistance 33 and a capacitor 34 to the base of a normally conducting NPN transistor Q1.

Figure 2:
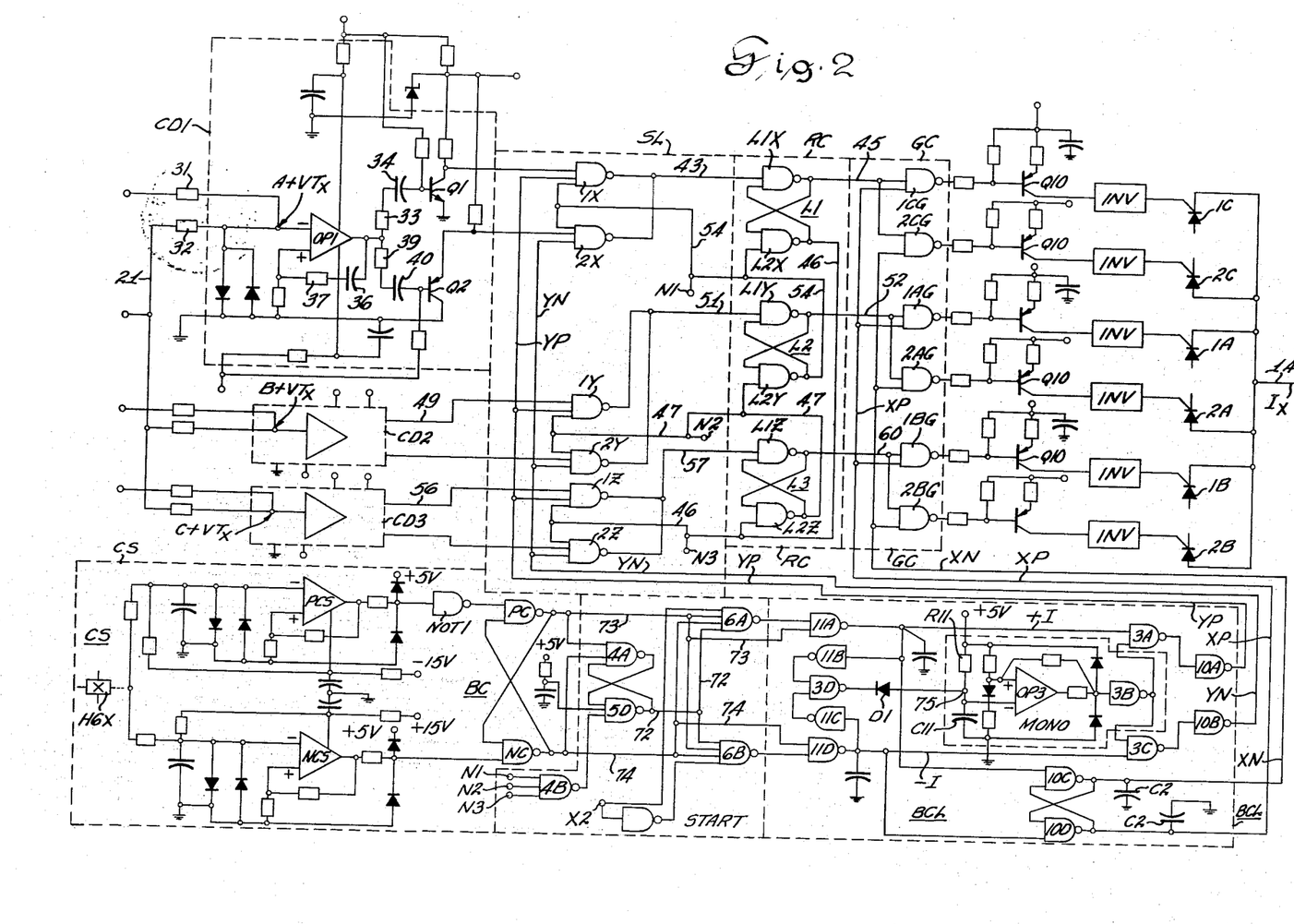
FIG. 2 is a circuit diagram of the intergroup blanking control shown in FIG. 1.

The differentiating circuit derives a negative-going pulse which reverse biases the base of transistor Q1 and turns it off. Turning off transistor Q1 increases its collector potential and applies logic 1 voltage to an input of a NAND gate 1X of the steering logic circuit SL to initiate generation of the gating signal 24 for SCR 1C of the positive group PX as described hereinafter. The change of amplifier output potential from positive to negative is fed back through a capacitor 36 and a resistance 37 to the noninverting input of amplifier OP1 to thereby raise its trip level so that the sequence signal $A+VT_x$ must decrease to a lower magnitude in order to trigger it to the opposite condition.

When the sequence signal $A+VT_X$ crosses the zero axis in the negative-going direction, the polarity of the output from operational amplifier OP1 goes from negative to positive and is coupled through a differentiating circuit comprising a resistance 39 and a capacitor 40 to the base of a normally conducting PNP transistor Q2, thereby causing the differentiating circuit to generate a positive-going pulse which turns transistor Q2 off. The emitter of transistor Q2 is driven in the positive direction when it turns off, thereby applying logic 1 voltage to an input to a NAND gate 2X of the steering logic circuit SL to initiate generation of the gating signal 25 for SCR 2C of the negative group NX as described hereinafter.

In a similar manner, crossing detector CD2 senses positive-going zero crossings of signal $B+VT_X$ to apply logic 1 voltage to an input of a NAND gate 1Y of the steering logic circuit SL and also senses negative-going zero crossings to apply logic 1 voltage to an input of a NAND gate 2Y. Similarly, crossing detector CD3 senses positive-going and negative-going zero crossings of sequence signal $C+VT_x$ to apply logic 1 voltage to an input of NAND gates 1Z and 2Z, respectively, of the steering logic current SL.

The points at which the sequence signals $A+VT_x$, $B+VT_x$ and $C+VT_x$ cross the zero axis determine the firing angles of the SCR's 1A, 1B, 1C, 2A, 2B and 2C and are regulated by the input signals to the quadrature windings SIN and COS of the vector adder angle sensor AS. Similarly, the points at which sequence signals $A+VT_y$, $B+VT_y$ and $C+VT_y$ cross the zero axis determine the firing angles of the SCR's of set 15Y, and the points at which signals $A+vT_z$, $B+VT_z$ and $C+VT_z$ cross the zero axis determine the firing angles of the SCR's of set 15Z.

Crossing detectors CD1, CD2 and CD3 of firing signal generator FGX determine the firing angles and sequence of gating of the SCR's 1A, 1B, 1C, 2A, 2B, 2C of set 15X. Firing circuit generator FGX also includes a blanking circuit BC shown schematically within the dash-dot rectangle in FIG. 1 that determines which of the groups PX or NX of SCR's, if any, is to be fired.

Alternating intergroup blanking circuits for SCR's are known wherein firing signals are supplied to only one current carrying SCR group at any one time so as to prevent circulating currents between the groups. Such alternating group blanking circuits may sense the current delivered by each SCR group and hold the nonconducting group off until the last SCR of the conducting group is turned off by natural commutation, for example, by blocking firing pulses to the positive group while the negative group is carrying current and blocking firing pulses to the negative group while the positive group is carrying current with alternating group switching timed in accordance with zero current in the AC output. Problems are encountered in such group blanking circuits in that the SCR's of the nonconducting group may be turned on before all SCR's of the conducting group have regained blocking control even though the gating signals thereto are blanked and, further, multiple or false zero crossing may occur near the beginning and end of the positive and negative half cycles which cause undesired switching from one current conducting group to the other. Still further, transients having current envelopes tangent to or near current zero may occur which turn on a group of the wrong polarity to supply the load so that output current will remain at zero for a time, dependent upon the RC time constant of the load and produce flats, or portions of zero currents, in the output current wave. In order to overcome these disadvantages, blanking circuits introduce a time delay between the signal blanking a conducting group and the signal unblanking a nonconducting group, and other circuits in response to zero load current make the positive and negative groups available in alternation to the load until one of the groups supplies the load current required.

Known intergroup blanking circuits which only permit one group to be on at a time and introduce a time delay between the signal blanking a conducting group and the signal unblocking the nonconductive group are not suitable for energizing a synchronous motor which may operate above base speed for the reason that an excessive overvoltage will appear at the motor terminals if the stator winding circuit is allowed to open even during current zero.

Blanking circuit BC fires the SCR's of groups PX and NX in a manner that prevents intergroup circulating currents and always has at least one SCR firing even at current zero, thereby eliminating the necessity of center-tapped reactors between positive and negative groups and permitting the cycloconverter to drive a synchronous motor above its base speed. Blanking circuit BC allows only one SCR to be on at any time except near current zero when two SCR's coupled to the same generator bus, one in the positive group PX and the other in the negative group NX, are fired on. Blanking circuit BC permits the SCR's to be fired only in a predetermined sequence, for example, 1A, 1B and 1C in the positive group PX for positive current and 2A, 2B and 2C in the negative group NX for negative current.

The SCR gating signals 24-29 derived by crossing detectors CD1, CD2 and CD3 are coupled to a steering logic circuit SL which is responsive to logic 1 on a lead YP from a blanking control logic circuit BCL (shown in block form in FIG. 1) to enable positive group steering logic gates 1X, 1Y and 1Z which transmit (unblank) firing signals 24, 26 and 28 to positive group SCR's 1C, 1A and 1B. Steering logic circuit SL is responsive to logic 1 on a lead YN to enable negative group steering logic gates 2X, 2Y and 2Z which transmit (unblank) gating signals 25, 27 and 29 to negative group SCR's 2C, 2A and 2B and is also responsive to logic 0 on lead YP or lead YN to disable the corresponding gates to respectively prevent sequencing of (blank) the positive group SCR's and the negative group SCR's.

Gating signals 24, 26 and 28 generated at the collectors of transistors Q1, Q3 and Q5 are coupled to inputs to positive group steering logic gates 1X, 1Y and 1Z (which are enabled when logic 1 appears on lead YP from blanking control logic circuit BCL) to transmit the positive group gating signals and thus allow the SCR's 1C, 1A and 1B of positive group PX to be sequentially gated on. Similarly, negative group gating signals 25, 27 and 29 generated at the collectors of transistors Q2, Q4 and Q6 are coupled to inputs of negative group steering logic gates 2X, 2Y and 2Z (which are enabled when logic 1 appears on lead YN from blanking control logic circuit BCL) to transmit gating signals 25, 27 and 29 and thus permit SCR's 2C, 2A and 2B of negative group NX to be sequentially fired.

The SCR gating signals transmitted by steering logic circuit SL are coupled to a ring counter and latch current RC comprising three latches L1, L2 and L3 which are interlocked so that they are set in the sequence A, B and C. Each latch L1, L2 and L3 when set is capable of supplying gating pulses to a pair of SCR's coupled to the same generator bus with one SCR of the pair in positive group PX and one SCR in the negative group NX, i.e., latch L1 when set can supply gating signals to SCR's 1C and 2C coupled to generator bus C; latch L2 when set can supply gating signals to SCR's 1A and 2A coupled to generator bus A; latch L3 when set can supply gating signals to SCR's 1B and 2B connected to generator bus B.

The SCR gating signals from ring counter circuit RC are coupled to a group control circuit GC comprising three positive group control gates 1CG, 1AG and 1BG responsive to logic 1 on a lead XP from blanking control circuit BCL to supply a gating signal to the SCR of the positive group PX associated with the latch L1, L2 or L3 which is set at that time, and three negative group control gates 2CG, 2AG and 2BG are responsive to logic 1 on a lead XN to supply a gating signal to the SCR 2C, 2A or 2B of the negative group NX associated with the latch L1, L2 or L3 which is set at that instant.

The output signals from gates 1CG, 1AG, 1BG, 2CG, 2AG and 2BG of group sequence control circuit GC are individually coupled through power level raising transistors Q10 (see FIG. 2) to inverters INV shown in block form which derive gating signals for the corresponding SCR's as disclosed in aforementioned U.S. Pat. No. 3,584,276.

Blanking circuit BC includes a current sensor circuit CS shown in block form in FIG. 1 which receives an input from a Hall generator current detector HGX for sensing magnitude and direction of current $I_x$ in lead 14 to motor stator winding X and also includes blanking control logic circuit BCL which is responsive to the output from current sensor circuit CS to provide logic 1 on leads YP and XP when motor current in lead 14 is positive to thereby unblank positive group SCR's 1A, 1B and 1C and blank negative group SCR's 2A, 2B and 2C, and blanking control logic circuit BCL also provides logic 1 on leads YN and XN when motor current $I_x$ in lead 14 is negative to thereby unblank negative group SCR's 2A, 2B and 2C and blank positive group SCR's 1A, 1B and 1C.

Figure 4A:
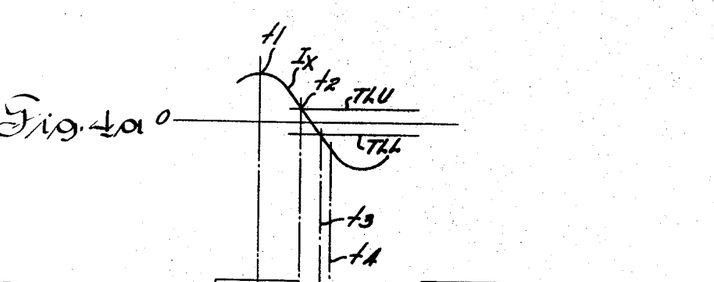
FIG. 4a shows an ideal sinusoidal output current $I_x$ from one phase of the cycloconveter on lead 14 supplied to motor winding X.

When motor current $I_x$ in lead 14 is approaching the zero axis in the negative-going direction and reaches the upper tripping level TLU shown in FIG. 4a (or in the positive-going direction and reaches the lower tripping level TLL), blanking control logic circuit BCL is responsive to the output from current sensor circuit CS to apply logic 0 to both leads YP and YN to prevent further transmittal of gating signals to either the positive group PX or the negative group NX and to apply logic 1 to both leads XP and XN, thereby enabling both group logic gates associated with the then set latch L1, L2 or L3 and turning on the last conducting SCR and the SCR of the opposite group coupled to the same generator bus so that one SCR in each group coupled to the same generator bus conducts while motor current is passing through zero. As soon as current $I_x$ in lead 14 is greater than tripping level TLU or TLL and its direction is detected by current sensor circuit CS, the blanking logic circuit BCL changes either lead XP or XN to logic 0 to turn off (blank) the SCR group not carrying current and operates a timer MONO (shown in FIG. 2) which maintains logic 0 on both leads YP and YN for a sufficient interval of time to allow the SCR last carrying current in the nonconducting group to commutate off before logic 1 is applied to lead YP or YN to transmit gating signals to (unblank) the appropriate positive or negative group.

Steering Logic

Gates 1X, 2X, 1Y, 2Y, 1Z and 2Z of the steering logic circuit SL select whether the gating signals 24, 26 and 28 are to be transmitted (unblanked) to fire SCR's 1C, 1A and 1B of the positive group PX in sequence while the firing signals to the negative group NX are blanked, or whether gating signals 25, 27 and 29 are to be transmitted (unblanked) to fire SCR's 2C, 2A and 2B of the negative group NX in sequence while gating signals to the positive group PX are blanked. It will be recalled that gating signals 24, 25, 26, 27, 28, and 29 are applied to one input of steering logic NAND gates 1X, 2X, 1Y, 2Y, 1Z and 2Z respectively. A second input to each of NAND gates 1X, 1Y, and 1Z for the positive group gating signals is over a lead YP from the blanking control logic circuit BCL, and a logic 1 voltage of lead YP opens gates 1X, 1Y and 1Z so that positive group gating signals 24, 26 and 28 can be supplied to SCR's 1C, 1Z and 1B, respectively, in sequence, while a logic 0 on lead YP disables positive group steering logic gates 1X, 1Y and 1Z so that the gating signals cannot be transmitted to SCR's 1C, 1A and 1B of the positive group PX. Similarly, a second input to each of negative group steering logic NAND gates 2X, 2Y and 2Z is over a lead YN from the blanking control logic circuit BCL, and a logic 1 voltage on lead YN enables gates 2X, 2Y and 2Z so that negative group gating signals 25, 27 and 29 can be applied to SCR's 2C, 2A and 2B of negative group NX in sequence, while a logic 0 on lead YN disables steering logic gates 2X, 2Y and 2Z so that the gating signals 25, 27 and 29 cannot fire the SCR's 2C, 2A and 2B of the negative group NX.

The outputs of steering logic gates 1X and 2X are commoned and appear on a lead 43. Similarly, the outputs of gates 1Y and 2Y are commoned and appear on a lead 51, and the outputs of gates 1Z and 2Z are commoned and appear on a lead 57.

Ring Counter and Latch Circuit

The output signals from steering logic circuit SL appearing on leads 43, 51 and 57 are applied to a ring counter RC shown within a dashed line rectangle in FIG. 2 comprising three latches L1, L2, and L3 which are interlocked so that they are set in the sequence A, B, and C and only one latch at a time can be set. Latches L1, L2 and L3 gate (unblank) the SCR's of positive group PX or of negative group NX in a predetermined sequence and only permit one SCR of a group to be gated on at a time. Latch L1 transmits gating signals 24 and 25 to SCR's 1C and 2C; latch L2 transmits gating signals 26 and 27 to SCR's 1A and 2A; and latch L3 transmits gating signals 28 and 29 to SCR's 1B and 2B. Each latch L1, L2 and L3 is "set" in response to a logic 0 signal from the group steering logic circuit SL to transmit a gating signal (i.e., provide logic 1 output) and when so set it disables the steering logic gates (and resets the latch) associated with the previously conducting SCR and prepares the latch and steering logic gates associated with the succeeding SCR to fire.

Assuming logic 1 on lead YP or lead YN, crossing of the zero axis by sequence signal A+VT$_x$ sets latch L1 which then transmits gating signal 24 or 25 to SCR's 1C or 2C, disables steering logic gates 1Z and 2Z and resets latch L3 associated with previously conducting SCR 1B or 2B, and also prepares steering logic gates 1Y and 2Y to be enabled and latch L2 associated with next-to-fire SCR's 1A or 2A to be set. Crossing of the zero axis by sequence signal B+VT$_x$ sets latch L2 to transmit gating signal 26 or 27 to SCR 1A or 2A, and setting of latch L2 disables steering logic gate 1X and 2X and resets latch L1 to terminate firing signals 24 or 25 to SCR 1C or 2C, and also prepares steering logic gates 1Z and 2Z and latch L3 associated with next-to-fire SCR's 1B and 2B. Crossing of the zero axis by sequence signal C+VT$_x$ sets latch L3 to transmit gating signal 28 or 29 to SCR 1B or 2B, and setting of latch L3 disables steering logic gates 1Y and 2Y and resets latch L2 to terminate gating signal 26 or 27 to SCR 1A or 2A, and also prepares steering logic gates 1X and 2X and latch L1 associated with SCR's 1C and 2C.

Latch L1 comprises a pair of cross-coupled NAND gates L1X and L2X with the output of gate L1X coupled to one input of gate L2X and the output of gate L2X coupled to one input of gate L1X. The outputs of steering logic gates 1X and 2X are commoned and connected over lead 43 to a second input of gate L1X. Assume that latch L1 has been reset with logic 0 output from gate L1X when latch L2 was set and that logic 1 exists on lead 54, and thus on inputs to gates 1X, 2X and L2X, when latch L3 was set. Assume further that logic 1 exists on lead YP and that sequence signal $A+VT_x$ crosses the zero axis in a positive-going direction which is sensed by crossing detector CD1 so that steering logic gate 1X provides logic 0 on lead 43. Gate L1X of latch L1 is responsive to logic 0 on lead 43 to set latch L1 and provide logic 1 output on a lead 45 to the succeeding group control gates 1CG and 2CG which will fire SCR 1C and/or 2C depending on the signals on leads XP and XN as described hereinafter. Logic 1 on lead 45 is coupled to one input to gate L2X so that it provides a logic 0 output which is coupled to the other input of gate L1X to thereby hold latch L1 in set condition. The logic 0 output from gate L2X is also coupled over a lead 46 to one input of gate L2Z of latch L3 which changes states and provides a logic 1 output over lead 47 to inputs of steering logic gates 1Y and 2Y to prepare them to be enabled and also to an input to gate L2Y of latch L2 to prepare it to be set. The logic 0 from gate L2X on lead 46 is also coupled to an N3 lead to the START circuit for a purpose to be described hereinafter and is also coupled to one input of each of steering logic gates 1Z and 2Z to disable them. The resulting logic 1 signals from steering logic gate 1Z and from gate L2Z resets latch L3 with logic 0 output from gate L1Z on lead 60 to terminate firing signal 28 to SCR 1B.

When sequence signal $B+VT_x$ crosses the zero axis in the positive-going direction, crossing detector CD2 applies logic 1 gating signal 26 (assuming logic 1 still exists on lead YP) to lead 49 which enables gate 1Y so that it provides logic 0 on lead 51 to one input to gate L1Y of latch L2 of the ring counter. In response thereto gate L1Y provides logic 1 output on lead 52 to the succeeding group control gate 1AG to transmit gating signal 26 to SCR 1A. The logic 1 on lead 52 is also applied to an input to gate L2Y which changes its output to logic 0. The logic 0 output from gate L2Y is applied over a lead 54 to one input of both steering logic gates 1X and 2X to disable them and thus terminate gating signal 24 to SCR 1C. The logic 0 output from gate L2Y is also applied to an input to gate L2X to reset latch L1 with logic 0 output from gate L1X and with logic 1 output from gate L2X on lead 46 which is coupled to one input of both steering logic gates 1Z and 2Z to prepare them so that they can be enabled when sequence signal $C+VT_x$ crosses the zero axis.

When sequence signal $C+VT_x$ crosses the zero axis in a positive-going direction, crossing detector CD3 provides gating signal 28 on a lead 56 which is coupled to one input to steering logic gate 1Z and enables it (assuming logic 1 exists on lead YP). Opening of gate 1Z provides logic 0 on lead 57 which is applied to one input to gate L1Z of latch L3. The resulting logic 1 output from gate L1Z is coupled: (a) over a lead 60 to the succeeding group control gate 1BG to fire SCR 1B as described hereinafter; and (b) to one input to gate L2Z of latch L3 to open it so that it provides logic 0 output. The logic 0 output from gate L2Z is coupled over lead 47 to one input to each of gates 1Y and 2Y to disable them and terminate gating signal 26 to SCR 1A and also over lead 47 to one input to gate L2Y which changes its output to logic 1 to reset latch L2. The logic 1 output from gate L2Y is coupled: (a) over lead 54 to one input to each of gates 1X and 2X so that they can be enabled when sequence signal $A+VT_x$ crosses the zero axis; and (b) to one input to gate L2X to prepare it to be set. The conditions are now the same as originally assumed, and the latches L1, L2 and L3 will be respectively set in the order L1, L2 and L3 so that the SCR's of positive group PX can only fire in the sequence 1C, 1A, 1B, the SCR's of negative group NX can only be gated in the sequence 2A, 2B, 2C and only one SCR of each group can be fired at a time.

Group Control Circuit

The gating signal outputs from ring counter RC appearing on leads 45, 52 and 60 are coupled to a group control circuit GC shown within a dashed line rectangle in FIG. 2 which regulates whether the positive group PX or the negative group NX is to be fired and comprises six NAND gates 1CG, 2CG, 1AG, 2AG, 1BG and 2BG. Gates 1CG and 2CG are associated with latch L1 and SCR's 1C and 2C which are both coupled to generator bus C but are in the positive and negative groups PX and NX, respectively. Gates 1AG and 2AG are associated with latch L2 and SCR's 1A and 2A. Gates 1BG and 2BG are associated with latch L3 and SCR's 1B and 2B.

Lead 45 is coupled to one input to each of gates 1CG and 2CG; lead 52 is coupled to one input of each of gates 1AG and 2AG, and lead 60 is coupled to one input of each of gates 1BG and 2BG. A second input to each of positive group control gates 1CG, 1AG and 1BG is over a lead XP from the blanking logic control cricuit BCL, and a logic 1 voltage signal on lead XP permits gate 1CG, 1AG or 1BG to transmit a gating signal 24, 26 and 28 appearing on lead 45, 52 or 60 associated with the then set latch L1, L2 or L3 to the corresponding SCR 1C, 1A or 1B. A second input to each of negative group control gates 2CG, 2AG and 2BG is over a lead XN from the blanking logic control circuit BCL, and logic 1 on lead XN permits a gate 2CG, 2AG or 2BG to transmit a gating signal 25, 27 or 29 appearing on lead 45, 52 or 60 associated with the set latch L1, L2 or L3 to fire SCR 2C, 2A or 2B. The power level of outputs from gates 1CG, 2CG, 1AG, 2AG, 1BG and 1BG are inverted and stepped up through suitable transistors Q10 to inverters 1NV shown in block form of the type disclosed in aforementioned U.S. Pat. No. 3,584,276 to gate the SCR's 1C, 2C, 1A, 2A, 1B and 2B, respectively.

BLANKING CIRCUIT

General Description

Blanking circuit BC allows only one SCR at a time to be conducting except when the motor current $I_x$ in lead 14 crosses the zero axis at which time a pair of SCR's coupled to the same generator phase can be conducting with one SCR of the pair in the positive group PX and the other in the negative group NX; for example, SCR's 1B and 2B coupled to generator phase $\phi_B$. At time t1 during the positive half cycle of motor current $I_x$ in lead 14 shown in FIG. 4, logic 1 exists on lead XP (as shown in FIG. 4e) and on lead YP (as shown in FIG. 4g) so that gating signals are being applied in sequence to the SCR's of the positive group PX, logic 0 exists on leads XN and YN (as shown in FIGS. 4f and 4h respectively) so that gating signals to the SCR's of negatvie group NX are being blanked, and the output of a monostable multivibrator, or time MONO of the blanking logic control circuit at the output of a NAND gate 3B is logic 1 (as shown in FIG. 4d) to thereby permit generation of the steering logic control signals YP and YN.

When current $I_x$ in lead 14 approaches the zero axis in the negative-going direction and decreases below the upper triggering level TLU at time $t2$ and is detected by current sensor circuit CS, blanking control logic circuit BCL is responsive to the output of current sensor circuit CS to apply logic 0 to both leads YP and YN to thereby disable all the steering logic gates 1X, 1Y, 1Z, 2X, 2Y, 2Z and thus prevent transmitting of gating signals to the SCR's of both positive group PX and negative group NX so that no other SCR's can be fired. At time $t2$ blanking control logic BCL circuit also triggers monostable multivibrator MONO to its unstable state wherein it maintains logic 0 on leads YP and YN. At time t2 one latch (assumed to be latch L3) is set so that the last positive group SCR to be fired (assumed to be 1B) is the only one conducting. After a short time delay blanking control logic circuit BCL applies logic 1 to both leads XP and XN to permit the last positive group SCR to be fired (assumed to be 1B) to remain conducting and to fire the SCR connected to the same generator phase but in the opposite group, namely SCR 2B in negative group NX. Both SCR's 1B and 2B are turned on because they are associated with the then set latch L3 which is providing a logic 1 output on lead 60 to inputs of group control gates 1BG and 2BG which are also receiving logic 1 inputs over leads XP and XN, and it will be appreciated that no intergroup circulating currents will flow since both conducting SCR's 1B and 2B are coupled to the same generator bus $\phi_B$.

Blanking circuit BC then waits until the current $I_x$ in lead 14 is sensed to be above the triggering level in either direction. Assuming that current $I_x$ in lead 14 is now in the negative direction and exceeds the lower triggering level TLL at time $t3$, blanking control logic circuit BCL is responsive to the output from current sensor circuit CS to: (a) apply logic 0 to lead XP (See FIG. 4e) to disable group control gate 1BG and thus remove gating signals from the only conducting SCR 1B of the positive group; (b) maintain logic 1 on lead XN so that the SCR 2B of negative group NX continues to conduct; and (c) trigger the monostable multivibrator MONO so that it will switch to its stable state after a time delay. After a time delay sufficient to allow the positive group SCR last carrying current, namely SCR 1B, to commutate before allowing any other SCR to fire, the output of timer MONO goes to logic 1 at time $t4$ shown in FIG. 4d to thereby apply logic 1 to lead YN (See FIG. 4h) to permit the negative group steering logic gates 2X, 2Y, 2Z to be opened sequentially by gating signals 25, 27, 29 to sequentially fire SCR's 2C, 2A and 2B of negative group NX.

Blanking circuit BC operates in a similar manner when current $I_x$ in lead 14 crosses the zero axis in the positive going direction.

If motor current $I_x$ in lead 14 does not continue in the negative-going direction and rather becomes positive-going and exceeds upper triggering level TLU, blanking control logic circuit BCL is responsive to the output from current sensor circuit CS to: (a) apply logic 1 to lead XP to enable group logic control gate 1BG so that the gating signal is maintained to SCR 1B of the positive group; (b) apply logic 0 to lead XN to disable gate 2BG and thus remove the firing signal from SCR 2C of the negative group; and (c) trigger timer MONO so that it will switch to its stable state. After a time delay sufficient to allow negative group SCR 2C to commutate, the output of timer MONO goes to logic 1 to thereby apply logic 1 to lead YP to permit positive group steering logic gates 2X, 2Y and 2Z to be opened sequentially by gating signals 24, 26, 28 and sequentially fire SCR's 1C, 1A and 1B of positive group PX.

Current Sensor Circuit

It is schematically represented by a rectangle HGX enclosing the symbol for a Hall generator in FIGS. 1 and 2 that a Hall generator sensor detects the current $I_x$ in lead 14 to motor stator phase winding X and provides an output voltage whose polarity and magnitude are indicative of the direction and magnitude of current $I_x$ in motor lead 14. The signal from current sensor HGX is coupled to the inverting inputs of both a positive current sensor operational amplifier PCS and of a negative current sensor operational amplifier NCS. The output of positive current sensor amplifier PCS is coupled through a NOT gate inverter NOT 1 to one input of a NAND gate PC, and the output of negative current sensor amplifier NCS is coupled to one input of a NAND gate NC. Gates PC and NC are cross-coupled with the output of each coupled to one input of the other.

Assuming that the motor winding current in lead 14 is in the positive direction and above the upper triggering level TLU, the output of Hall generator HGX will be positive, the output of positive current sensor amplifier PCS will be negative, or logic 0 and that of negative current sensor amplifier NCS will also be negative, or logic 0. The resulting output from inverter NOT 1 will be logic 1, the output of NAND gate NC having a logic 0 input will be logic 1, and the output from NAND gate PC having both inputs at logic 1 will be logic 0.

The output of gate PC is coupled to one input of a four-input NAND gate 6A and also to one input of a four-input NAND gate 6B of the START circuit to be described hereinafter, and the output of gate NC is coupled to one input of each of the gates 6A and 6B of the START circuit.

A logic 0 output from either gate PC or NC will provide logic 1 outputs from both gate 6A and gate 6B, and such logic 1 outputs from gates 6A and 6B eliminate the effect of the START circuit so that it will not interfere with the normal sequencing of SCR's and blanking and unblanking of the positive and negative groups. Further, when any latch L1, L2 or L3 is set during normal sequencing of the SCR's a "zero current" or "start" latch of the START circuit comprising a NAND gate 4A and a NAND gate 5D will supply logic 0 over a lead 72 to one input of each of gates 6A and 6B to eliminate the effect of the START circuit during normal sequencing as disclosed hereinafter.

Current sensor circuit CS thus provides logic 1 from both gates PC and NC when motor current $I_x$ is lower than triggering levels TLL and TLU; it provides logic 0 from gate PC and logic 1 from gate NC when motor current $I_x$ is positive and greater than triggering level TLU; and it provides logic 1 from gate PC and logic 0 from gate NC when current $I_x$ is negative and exceeds triggering level TLL.

Blanking Control Logic

The output of gate 6A of the START circuit is coupled to one input of a NAND gate 11A of blanking control logic circuit BCL, and the output of gate PC is applied over a lead 73 to the other input to gate 11A. Since the output from gate 6A in logic 1 when motor current $I_x$ is flowing, the positive current signal output from gate 11A on a lead +I will be logic 1 and logic 0 respectively when current flow is in the positive and negative directions in motor winding lead 14.

The output of gate 6B of the START circuit is coupled to one input of a NAND gate 11D, and the output of gate NC is applied over a lead 74 to the other input to gate 11D. Since the output from gate 6B in logic 1 when motor current $I_x$ is flowing, the negative current signal output from gate 11D on a lead −I will be logic 0 and logic 1 respectively when current flow is in the positive and negative directions in motor winding lead 14.

The positive current signal on lead +I is coupled to one input of a NAND gate 3A whose output is applied through an inverter, or NOT gate 10A to lead YP which is connected to inputs to positive group steering logic gates 1X, 1Y and 1Z. The other input to gate 3A is from the output of NAND gate 3B of monostable multivibrator MONO which is logic 1 when motor winding current $I_x$ is flowing in lead 14. The output from gate 3A will thus be logic 0 and positive steering signal lead YP will be at logic 1 if positive current signal lead +I is at logic 1 to permit enabling of positive group steering logic gates 1X, 1Y and 1Z.

The negative current signal lead −I is coupled to one input to a NAND gate 3C having its other input connected to the output of gate 3B, and the output of gate 3C is coupled through an inverter, or NOT gate 10B to the YN lead which is connected to one input of each of the negative group steering logic gates 2X, 2Y, 2Z. When current $I_x$ in motor winding lead 14 is positive, negative current signal lead −I will be at logic 0, and negative steering lead YN will be at logic 0 to disable negative group steering logic gates 2X, 2Y and 2Z and thus blank the negative group SCR's.

A "group control" latch comprises two cross-coupled NAND gates 10C and 10D having the output of each connected to one input of the other. A second input to gate 10C is from positive current signal lead +I, and its output is applied to lead XN which is coupled to one input of each of negative group control gates 2CG, 2AG and 2BG of the group control circuit GC. A second input to gate 10D is the negative current signal on lead −I, and its output is applied to lead XP which is coupled to one input of each of positive group control gates 1CG, 1AG and 1BG of group control circuit GC. The logic 1 appearing on positive current signal lead +I and the logic 0 appearing on negative current signal lead −I when motor winding current $I_x$ in lead 14 is in the positive direction results in logic 0 output from gate 10C on lead XN which disables the negative group control gates 2CG, 2AG and 2BG, and also results in logic 1 output from gate 10D on lead XP which opens positive group control gates 1CG, 1AG and 1BG and allows gating signals 24, 26 and 28 to fire positive group SCR's 1C, 1A and 1B, respectively, in sequence.

Assume that the circuit is sequencing normally so that the logic 0 from the one set latch L1, L2 or L3 on terminal N1, N2 or N3 results in logic 1 from gate 4B; logic 0 from gate 5D, and logic 1 from both gates 6A and 6B of the START circuit so that they have no effect on gates 11A and 11D which can thus respond to the signals from gates PC and NC on leads 73 and 74, respectively. A −15 volt source is coupled to the inverting input of amplifier PCS, and a +15 volt source is coupled to the inverting input of amplifier NCS. When positive current $I_x$ in motor winding lead 14 approaches zero and decreases below upper triggering level TLU at time $t2$ in FIG. 4, the output of Hall generator current sensor HGX also approaches zero. Under such conditions the output of amplifier PCS becomes logic 1 and the output of amplifier NCS becomes logic 0. The logic 1 from amplifier PCS is converted to logic 0 by gate NOT 1 to provide a logic 1 output from NAND gate PC, and the logic 0 output from amplifier NCS provides a logic 1 output from gate NC.

Figure 4B:
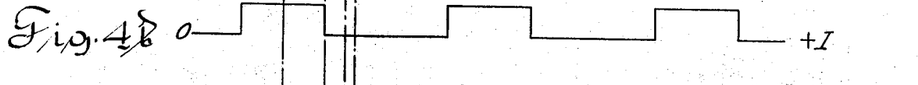
FIGS. 4b and 4c, respectively, show the positive current and negative current signals on the leads +I and −I of the blanking circuit of FIG. 2.
Figure 4C:
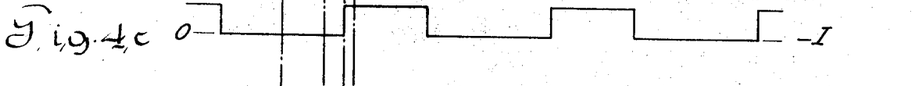
Figure 4D:
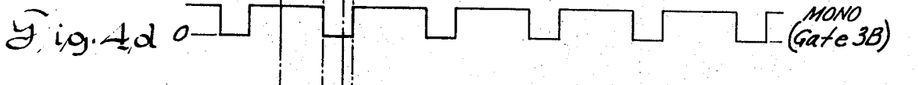
FIG. 4d shows the output signal from the monostable multivibrator MONO.
Figure 4E:
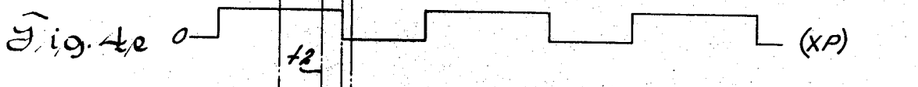
FIGS. 4e and 4f show the signals on leads XP and XN which respectively control the positive group control gates 1CG, 1AG, 1BG and the negative group control gates 2CG, 2AG, 2BG.
Figure 4F:
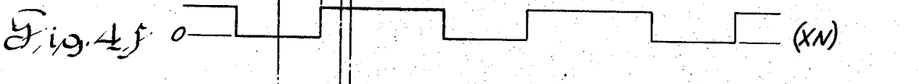
Figure 4G:
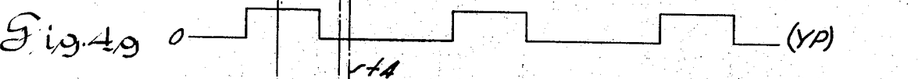
FIGS. 4g and 4h show the signals on leads YP and YN which respectively control the positive steering logic gates 1X, 1Y, 1Z and the negative steering logic gates 2X, 2Y 2Z.
Figure 4H:
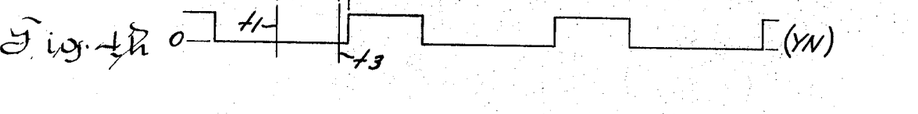

Such logic 1 outputs from gates PC and NC under zero motor current condition are coupled over leads 73 and 74 to inputs of gates 11A and 11D, respectively, and result in logic 0 appearing simultaneously (after a slight time delay) on the +I and −I leads as shown at time $t2$ in FIGS. 4b and 4c. The logic 0 leads +I and −I result in logic 1 outputs from gates 3A and 3C and logic 0 on both leads YP and YN (shown at FIGS. 4g and 4h) so that all steering logic gates 1X, 1Y, 1Z, 2X, 2Y and 2Z are disabled and no gating signals can be transmitted to change the states of latches L1, L2 and L3. The only SCR that is conducting is the positive group SCR that was last gated on, which is assumed to be SCR 1B, and is held on by the logic 1 output on lead 60 from set latch L3 and logic 1 on lead XP which enables gate 1BG. The logic 0 leads +I and −I results in logic 1 outputs from gates 10C and 10D which appear on leads XP and XN, respectively, a slight time delay interval subsequent to time $t2$. Such time delay is provided by capacitors C2 coupled to the outputs of gates 10C and 10D and allows the latches to assume a steady-state output in the event they were changing states at the instant steering logic gates 1X–2Z were turned off by YP and YN. The logic 1 on leads XP and XN opens both the positive group control gates 1CG, 1AG, 1BG and the negative group control gates 2CG, 2AG and 2BG to thereby permit two SCR's to be on at the same time, but only the last to be fired SCR of the conducting (positive) group PX (which was assumed to be SCR 1B) that was gated on by set latch L3, and the SCR of the negative group NX connected to the same generator phase $\phi_B$, namely negative group SCR 2B whose gating signal is generated by the logic 1 output on lead 60 from set latch L3 and the logic 1 on lead XN which results in logic 0 output from group control gate 2BG to fire SCR 2B.

Blanking circuit BC thus derives a positive current logic 1 signal on lead +I (and logic 0 on lead −I) when the cycloconverter output current $I_x$ in lead 14 is positive and greater than the predetermined triggering level TLU, and it derives a negative current logic 1 signal on lead −I (and logic 0 on lead +I) when the output current $I_x$ is negative and greater than the predetermined triggering level TLL. The group control latch 10C, 10D is responsive to such positive current logic 1 signal +I to derive a logic 1 positive group control signal on lead XP to enable the positive group control gates 1CG, 1BG, 1AG and to simultaneously derive a logic 0 "blanking" signal on leads XN to inhibit negative group control gates 2CG, 2BG, 2AG and thus prevent firing of negative group SCR's. The group control latch 10C, 10D is responsive to the negative current logic 1 signal −I to derive a logic 1 negative group control signal on lead XN to enable the negative group control gates 2CG, 2BG, 2AG and to concurrently derive a logic 0 "blanking" signal on lead XP to disable positive group control gates 1CG, 1AG, 1BG and thus prevent firing of positive group SCR's. The group control latch 10C, 10D is also responsive to the absence of both the positive current signal +I and the negative current +I (stated another way, responsive to logic 0 on leads +I and −I) to derive both the positive group logic 1 control signal XP and the negative group logic 1 control signal XN to thereby enable all group control gates 1CG, 1AG, 1BG, 2CG, 2AG, 2BG and thus turn on the pair of SCR's associated with the then set latch L1, L2 or L3.

The group control latch 10C, 10D may be described in another way as being responsive to the absence of the positive current logic 1 signal +I for deriving the negative group logic 1 control signal XN for enabling the negative group control gates 2CG, 2AG, 2BG and being responsive to the absence of the negative current logic 1 signal −I for deriving the positive group logic 1 control signal for enabling positive group control gates 1CG, 1AG, 1BG.

Timer

Leads +I and −I are respectively connected to inputs to inverter, or NOT gates 11B and 11C having their outputs coupled to the inputs of a NAND gate 3D. The output of gate 3D is coupled through a diode D1 to the input of monostable multivibrator, or timer MONO at the junction 75 of a timing resistance R11 and a timing capacitor C11 connected in series between a +5v volt source and ground. Junction 75 is connected to the inverting input of an operational amplifier OP3 whose output is coupled to the input to inverter, or NOT gate 3B. As long as motor current $I_x$ is flowing and logic 0 exists on either lead +I or lead −I, the output of gate 3D is logic 1 which is blocked by diode D1, and timing capacitor C11 remains charged from the +5v volt source through resistance R11 to a positive, or logic 1 voltage which will result in logic 0 output from operational amplifier OP3 and logic 1 output from NOT gate 3B as seen in FIG. 4d at time t1. When motor current $I_x$ approaches zero so that both leads +I and −I become logic 0 simultaneously at time t2, both inputs to NAND gate 3D become logic 1 to provide logic 0 output from gate 3D and permit timing capacitor C1 to discharge through diode D1 to logic 0 voltage. The output of operational amplifier OP3 then becomes logic 1 and the output of gate 3B becomes logic 0 to provide the trailing edge of the square wave output from the timer at time t2 as shown in FIG. 4d. The logic 0 output of the timer from gate 3B results in logic 1 outputs from gates 3A and 3C which are converted by NOT gates 10A and 10B to logic 0 on leads YP and YN to disable all steering logic gates and prevent transmitting of gating signals to the latches controlling any other SCR's. Stated another way, the monostable multivibrator MONO has first (logic 1) and second (logic 0) states and provides a time delay in switching from the second (0) to the first state (1), and gate means 3A, 3C are responsive to the second (0) state of the multivibrator MONO to prevent generation of both the positive logic 1 steering signal YP and the negative logic 1 steering signal YN and thus disable the firing circuit sequencing means as long as the cycloconverter output current $I_x$ is below the predetermined triggering level.

When the cycloconverter output current $I_x$ flowing in the negative direction in lead 14 to motor winding X exceeds the lower triggering level TLL at time t3, the negative output voltage from Hall generator current sensor HGX coupled to the inverting inputs of both positive current sensor amplifier PCS and negative current sensor amplifier NCS provides logic 1 outputs therefrom. The elements of the blanking circuit BC then assume the following conditions:

| | |
|---|---|
| PCS | logic 1 |
| NCS | logic 1 |
| NOT 1 | logic 0 |
| PC | logic 1 |
| NC | logic 0 |
| 11A and +I | logic 0 |
| 11D and −I | logic 1 |
| 10C and XN | logic 1 |
| 10D and XP | logic 0 |
| 3B of MONO | logic 0 |
| 3A | logic 1 |
| 3C | logic 1 |
| 10A and YP | logic 0 |
| 10B and YN | logic 0 |

Leads YP and YN are maintained at logic 0 by the logic 0 output from gate 3B of the timer for approximately 200 microseconds subsequent to time t3 to permit the positive group SCR last carrying current, namely SCR 1B, to commutate before any other SCR's are allowed to fire. The logic 0 which appears after a slight time delay subsequent to time t3 on lead XP (FIG. 4e) is coupled to one input of each of positive group control gates 1CG, 1AG and 1BG to disable them and thus remove gating signals from the one conducting positive group SCR 1B. The logic 1 on lead XN is coupled to one input of each of negative group control gates 2CG, 2AG and 2BG and enables them to permit the one conducting negative group SCR 2B to continue to conduct and also permits SCR's 2C, 2A, 2B of the negative group NX to fire in sequence after the timer MONO times out.

The negative current logic 1 signal on lead −I when negative motor current $I_x$ exceeds triggering level TLL at time t3 results in logic 0 from NOT gate 11C and consequently logic 1 output from gate 3D which is blocked by diode D1, thereby permitting capacitor C11 to charge through resistance R11 to thereby initiate the timing cycle. After capacitance C11 charges for approximately 200 microseconds to allow the last conducting SCR of the positive group PX, namely SCR 1B, to commutate, the voltage across capacitor C11 becomes logic 1, the output of amplifier OP3 becomes logic 0, and the output of gate 3B becoms logic 1 at time t4 as shown in FIG. 4d. The logic 0 lead +I maintains logic 0 from gate 10A on lead YP so that positive group steering gates 1X, 1Y and 1Z continue to be disabled, and the logic 1 output from gate 3B at time t4 provides logic 0 from gate 3C and logic 1 output from gate 10B on lead YN (shown in FIG. 4h) which enables steering logic gates 2X, 2Y, 2Z and thus permits SCR's 2C, 2A and 2B of negative group NX to fire in sequence.

Described in another manner, the logic gates 11B, 11C, 3D receive the positive current signal +I and negative current signal −I as inputs and transfer the monostable multivibrator MONO to the second state (0) when the cycloconverter output current $I_x$ is below the triggering level and both logic 1 signals +I and −I are absent, and such logic gates 11B, 11C, 3D permit the multivibrator MONO to transfer to the first state (1) after a time delay when the output current $I_x$ exceeds the triggering level and either the positive current logic 1 signal +I or the negative current logic 1 signal −I is present.

START CIRCUIT

When the vehicle foot pedal (not shown) is initially depressed to call for current to motor 10, none of the SCR's of positive group PX or negative group NX are conducting, and the possibility exists that SCR's connected to the same generator phase bus may begin to conduct in each of the SCR sets 15X, 15Y and 15Z and thus result in simultaneous energization of motor phase windings X, Y, and Z and no motor torque. The START circuit prevents SCR's connected to the same generator phase bus from conducting in all motor phases at startup.

When no motor current is flowing, the outputs of motor current sensors HGX, HGY and HGZ in all three motor phases are zero, the ouputs of amplifiers PSC and NSC of firing signal generator FCX are logic 1 and logic 0, respectively, the output of gate NOT 1 is logic 0, and the output of gates PC and NC are both logic 1. Since two of the inputs to three-input gate 4A are logic 1, its output is controlled by gate 5D. Further, assuming all latches L1, L2 and L3 to be reset with logic 1 on terminals N1, N2 and N3, the output of gate 4B will be logic 0, and the output of gate 5D on lead 72 will be logic 1 so that gates 6A and 6B control the signal condition on leads +I and −I.

The logic 1 outputs from gates PC and NC under such zero motor current conditions are applied respectively to inputs to four-input NAND gates 6A and 6B of the START circuit, thereby permitting these gates to control the signals on leads +I and −I. Gates 6A and 6B are controlled by a signal appearing at a terminal X2 from a voltage sensor PTX shown schematically in FIG. 1 associated with output winding 16X of the angle sensor AS and indicates whether positive or negative current to motor phase winding X is desired. Similarly the gates 6A and 6B of the START circuits associated with motor stator phase windings Y and Z are controlled by signals from sensors PTY and PTZ respectively associated with output windingg 16Y and 16Z of the angle sensor AS. Alternatively the signal to be applied to terminal X2 can be provided by the capacitive rotor position tranducer disclosed in aforementioned U.S. Pat. application Ser. No. 253,418 in the name of Frederick A. Stich.

A logic 1 voltage on terminal X2 from voltage sensor PTX calling for positive current to motor winding X is coupled to one input to gate 6A and results in logic 0 output from gate 6A and thus a logic 1 positive current signal output from gate 11A on lead +I. The logic 1 from terminal X2 is also coupled to an input to an inverter, or NOT gate 4C whose logic 0 output is connected to an input gate 6B and thus results in logic 1 output from gate 6B and a logic 0 output from gate 11D on lead −I. The logic 1 positive current signal on lead +I results in logic 1 positive steering signal on lead YP which enables positive group steering logic gates 1X, 1Y, 1Z, and the logic 0 on lead −I results in logic 1 output from gate 10D on lead XP which opens positive group control gates 1CG, 1AG and 1BG so that gating signals 24, 26 and 28 can fire SCR's 1C, 1A and 1B of the positive group PX, thereby forcing current to flow in the positive direction to motor winding X. The logic 0 on lead −I also results in logic 1 output from gate 3C and logic 0 from gate 10B on lead YN to disable negative group steering logic gates 2X, 2Y, 2Z. The logic 1 on lead +I also results in logic 0 output from gate 10C on lead XN which disables negative group control gates 2CG, 2AG, and 2BG to prevent firing of negative group SCR's 2C, 2A, and 2B.

If the output from voltage sensor PTX associated with angle sensor winding 16X calls for negative current, the logic 0 on terminal X2 will result in logic 1 output from gate 6A, logic 0 from gate 11A on lead +I which will result in logic 1 negative group control signal output from gate 10C on lead XN that will enable negative group control gates 2CG, 2AG and 2BG. The logic 0 on terminal X2 will also result in logic 1 from gate 4C, logic 0 from gate 6B, logic 1 negative current signal from gate 11D on lead −I, logic 0 from gate 3C and logic 1 negative steering signal from gate 10B on lead YN which will enable negative group steering logic gates 2A, 2B and 2C to thereby transmit gating signals 25, 27 and 29 to negative group SCR's 2C, 2A and 2B and force current to flow in the negative direction to motor winding X.

The inptus to NAND gate 4A of the "start" latch are connected to the logic 1 outputs of gates PC and NC, respectively, so the output of gate 4A is logic 0 when no motor current $I_x$ is flowing. Gate 4A is cross-coupled to NAND gate 5D of the start latch so that gate 4A will not assume a logic 0 output (when gates PC and NC both go to logic 1) if gate 5D is already in the logic 0 state. The logic 0 output from gate 4A when motor current $I_x$ is not flowing provides a logic 1 output from gate 5D that is applied to one input to each of gates 6A and 6B and permits gates 6A and 6B to control the signal condition of leads +I and −I when no motor current $I_x$ is flowing. A second input to NAND gate 5D is from the output of a three-input NAND gate 4B whose inputs are coupled to terminals N1, N2 and N3, respectively, of the latches L1, L2 and L3 of the ring counter circuit RC.

A soon as motor current $I_x$ is sensed by Hall generator current sensor HGX, the output of either gate PC or NC goes to logic 0, the output of gate 4A to logic 1, and the output of the start latch from gate 5D goes to logic 0 which is applied over lead 72 to one input of each of gates 6A and 6B so that they provide logic 1 outputs and do not control the blanking circuit BC, therey removing the effect of the START circuit. When the blanking circuit BC is operating normally to fire the SCR's of the positive and negative groups in sequence, the output of gate 4B will be logic 1, since one latch L1, L2, or L3 of the ring counter circuit is set at all times and provides a logic 0 to the succeeding latch which is also applied to terminal N1, N2, or N3.

If for any reason motor current $I_x$ should decrease to zero and all latch circuits should be reset to apply logic 1 to terminals N1, N2, N3, the output of gate 4B would go to logic 0 and thus provide logic 1 output from gate 5D on lead 72 to again permit gates 6A and 6B to control the signal condition of leads +I and −I and thereby reinitiate the starting procedure.

The embodiments of the invention in which an exclusive property or privilege is claimed are defined as follows:

1. In combination, a polyphase voltage supply source (11), a cycloconverter comprising a positive current group of SCR's (1C, 1A, 1B) and a negative current group of SCR's (2C, 2A, 2B) connected in parallel between said polyphase supply source and an output lead (14) with the output side of said positive group connected directly to the output side of said negative group, firing circuit means (FGX) for applying gating signals to said SCR's of said cycloconverter to convert said supply source voltage into a desired AC output current in said output lead and so that said positive and negative groups alternately provide a half cycle of said AC output current in said output lead, and means responsive to said output current decreasing to a predetermined triggering level (TLU or TLL) when approaching the zero axis in either positive-going or negative-going direction for disabling said firing circuit means and for turning on a pair of SCR's connected to the same phase of said polyphase supply source with one SCR of said pair being in each of said groups.

2. In the combination of claim 1 and including means responsive to said output current exceeding said triggering level subsequent to turning on said pair of SCR's for commutating the one SCR of said pair supplying current of opposite polarity to said output current and for enabling said firing circuit means after said one SCR is commutated.

3. In the combination of claim 1 and including current sensor means (HGX, FIG. 2) coupled to said output lead (14) for detecting the magnitude and polarity of said output current, means (PCS, PC) coupled to said current sensor means for deriving a positive current signal (+I) when said output current is positive and greater than said predetermined triggering level, means (NCS, NC) coupled to said current sensor means for deriving a negative current signal (−I) when said output current is negative and greater than said predetermined trigerring level, a plurality of positive group control gates (1CG, 1AG, 1BG) for transmitting gating signals to the SCR's of said positive group, a plurality of negative group control gates (2CG, 2AG, 2BG) for transmitting gating signals to the SCR's of said negative group, and means (10C, 10D) responsive to said positive current signal (+I) and to said negative current signal (−I) respectively for deriving a control signal (XP) for said positive group control gates and for deriving a control signal (XN) for said negative group control gates and being responsive to the absence of both said positive current signal (+I) and said negative current signal (−I) to derive both said control signal for said positive group control gates and said control signal for said negative group control gates, whereby both said positive group control gates and said negative group control gates receive said control signals when said output current is below said predetermined triggering level while crossing the zero axis and permit turning on said pair of SCR's.

4. In the combination of claim 3 wherein said means for deriving control signals for said positive group control gates and negative group control gates includes NAND gate latch means (10C, 10D) comprising a pair of NAND logic gates which respectively receive said positive current signal (+I) and said negative current signal (−I) as inputs and have the output of each coupled to an input of the other.

5. In the combination of claim 3 wherein said means for deriving a positive current signal (+I) includes a first operational amplifier (PCS) having its inverting input coupled to said current sensor means and normally being biased to provide a first logic voltage output and said means for deriving a negative current signal includes a second operational amplifier (NCS) having its inverting input coupled to said current sensor means and normally being biased to provide a second logic voltage output opposite to said first logic voltage.

6. In the combination of claim 3 wherein said firing circuit means includes a plurality of positive steering logic gates (1X, 1Y, 1Z) for transmitting gating signals through said positive group control gates to said SCR's of said positive group, a plurality of negative steering logic gates (2X, 2Y, 2Z) for transmitting gating signals through said negative group control gates to said SCR's of said negative group, means (3A, 3B, 3C, 10A, 10B) responsive to said positive current signal (+I) and to said negative current signal (−I) respectively for deriving a positive steering signal (YP) and for deriving a negative steering signal (YN), said positive steering logic gates being controlled by said positive steering signal (YP) and said negative steering logic gates being controlled by said negative steering signal (YN), whereby no gating signals are transmitted to said SCR's when said output current is below said predetermined triggering level.

7. In the combination of claim 6 wherein said means for deriving said positive (YP) and negative (YN) steering signals includes timer means (MONO) for providing a time delay between the instant said output current exceeds said predetermined triggering level and generation of the corresponding steering signal, whereby the one SCR of said pair of SCR's supplying current of opposite polarity to said output current may be commutated before gating signals are again supplied to said positive and negative groups.

8. In the combination of claim 7 wherein said timer means includes monostable multivibrator means (MONO, 3B) having first (logic 1) and second (logic 0) states and providing a time delay in transferring from said second (0) to said first state (1), means (3A, 3C) responsive to said second state (0) of said monostable multivibrator for preventing generation of said positive (YP) and negative (YN) steering signals, and logic gate means (11B, 3D, 11C) receiving said positive current signal (+I) and said negative current (−I) signal as inputs for transferring said monostable multivibrator (MONO, 3B) to said second state (0) when both said positive current signal and said negative current signal are absent and permitting such multivibrator to transfer to said first state (1) after said time delay when either said positive current signal or said negative current signal is present.

9. In the combination of claim 6 wherein said means for turning on a pair of SCR's includes a plurality of interlocked latches (L1, L2, L3) between said steering logic gates and said group control gates, each of said latches (e.g., L1) being adapted to be alternately set and reset and is associated with a positive steering logic gate (1X) and with a negative steering logic gate (2X) and is set in response to the enabling of either steering logic gate, each of said latches (e.g., L1) also being associated with a positive group control gate (1CG) and a negative group control gate (2CG) which transmit gating signals respectively to a positive SCR (1C) and a negative group SCR (2C) coupled to the same phase of said supply source, said positive group control gate (1CG) being enabled when the associated latch (L1) is set and said positive group control signal (XP) is present and said negative group gate (2CG) being enabled when the associated latch (L1) is set and said negative group control signal (XN) is present, and means for interlocking said plurality of latches so that only one latch at a time can be set and so that they can only be set in a predetermined sequence.

10. In the combination of claim 7 and including a plurality of signal mixing means (e.g., OP1) each of which receives a command signal ($VT_x$) and one of the supply source phase voltages (e.g., $\phi A$) as inputs for deriving a plurality of sequencing signals (e.g., $A+VT_x$) and a plurality of crossing detector means receiving respective sequencing signals as inputs for sequentially enabling said positive steering logic gates (1X, 1Y, 1Z) in response to positive-going zero crossings of said sequencing signals and for sequentially enabling said negative steering logic gates (2X, 2Y, 2Z) in response to negative-going zero crossings of said sequencing signals.

11. In the combination of claim 1 wherein said cycloconverter is polyphase and has a plurality of output leads and a positive current group of SCR's and a negative current group of SCR's connected in parallel between said polyphase supply source and each of said output leads with the output side of the positive and negative groups associated with each output lead connected directly together.

12. In the combination of claim 1 wherein said means for turning on a pair of SCR's connected to the same supply source phase includes means for supplying gating signals to: (1) the one SCR that was conducting when said output current decreased to said triggering level, and (2) the SCR of the opposite group connected to the same phase of said supply source as said one SCR.

13. In the combination of claim 2 wherein said firing circuit means includes sequencing means for sequentially applying gating signals to the SCR's of said positive and of said negative groups, and wherein said means responsive to said output current decreasing to said predetermined triggering level when approaching the zero axis disables said sequencing means, and wherein said means responsive to said output current exceeding said triggering level subsequent to turning on said pair of SCR's enables said sequencing means after said one SCR is commutated.

14. In the combination of claim 13 wherein said sequencing means includes
  positive sequencing means for sequentially generating gating signals for the SCR's of said positive group, and
  negative sequencing means for sequentially generating gating signals for the SCR's of said negative group, and wherein said means responsive to said output current decreasing to said triggering level disables both said positive and said negative sequencing means.

15. In the combination of claim 14 wherein said positive sequencing means includes a plurality of positive group steering logic gates (1X, 1Y, 1Z) each of which is adapted when enabled to transmit a gating signal to one positive group SCR and is adapted to be enabled when it receives a positive steering signal input (YP) and said negative sequencing means includes a plurality of negative group steering logic gates (2X, 2Y, 2Z) each of which is adapted when enabled to transmit a gating signal to a negative group SCR and is adapted to be enabled upon receipt of a negative steering signal input (YN), and
  means including a current sensor (HGX) coupled to said output lead for deriving a positive steering signal (YP) when said output current is positive and greater than said triggering level and for deriving a negative steering signal (YN) when said output current is negative and greater than said triggering level, whereby no gating signals are generated for said SCR's when said output current decreases to said triggering level in crossing the zero axis.

16. In the combination of claim 15 wherein said sequencing means also includes a plurality of latches (L1, L2, L3) each of which is adapted to be alternately set and reset and is associated with one of said positive group steering logic gates and one of said negative group steering logic gates which transmit gating signals to a positive group SCR and a negative group SCR coupled to the same phase of said source, means for setting each latch in response to the enabling of either steering logic gate associated therewith, and
  means for interlocking said plurality of latches so that only one latch at a time can be set and so that they can only be set in a predetermined sequence.

17. In the combination of claim 16 and including a positive group control gate (e.g., 1CG) and a negative group control gate (e.g., 2CG) associated with each latch (i.e., L1) adapted when enabled to transmit said gating signals respectively to said positive group SCR and said negative group SCR associated with said latch, means including said current sensor for deriving a positive group control gate signal (XP) when said output current is positive or is less than said triggering level, and
  means including said current sensor for deriving a negative group control gate signal (XN) when said output current is negative or is less than said triggering level,
  each said positive group control gate being enabled in response to the associated latch being set and receipt of a positive group control gate signal input and each negative group control gate being enabled in response to the associated latch being set and receipt of a negative group control gate signal input.

18. In the combination of claim 17 and including means (PCS, NCS, 11A, 11B) including said current sensor (HGX) for deriving a positive current signal (+I) when said output current exceeds said triggering level in a positive direction and for deriving a negative current signal (−I) when said output current exceeds said triggering level in a negative direction, and wherein said positive steering signal and negative steering signal deriving means are responsive respectively to said positive current signal and to said negative current signal, and said positive group control gate signal and said negative group control gate signal deriving means are responsive respectively to the absence of said negative current signal and to the absence of said positive current signal.

19. In the combination of claim 13 wherein said sequencing means includes a plurality of latches each of which is adapted to be alternately set and reset and is associated with a pair of SCR's coupled to the same phase of said supply source with one SCR of said pair in the positive group and the other in the negative group, and means for interlocking said plurality of latches so that only one latch at a time can be set and so that they can only be set in a predetermined sequence.

20. In the combination of claim 19 and including positive group control gate means (e.g., 1CG) and negative group control gate means (e.g., 2CG) associated with each said latch (e.g., L1) for applying respective gating signals to the SCR's (1C and 2C) associated with said latch in response to the presence of both an enabling signal input (XN or XP) and the output of said latch when it is set, and wherein said means for turning on a pair of SCR's includes means responsive to said output current decreasing to said triggering level for applying enabling signals to all of said positive group control gate means (XP to 1CG, 1AG, 1BG) and to all of said negative group control gate means (XN to 2CG, 2AG, 2BG), whereby the pair of SCR's are turned on which are associated with the latch which was set at the instant said output current decreased to said predetermined triggering level.

21. In the combination of claim 20 wherein said sequencing means includes a positive group steering logic gate (e.g., 1X) and a negative group steering logic gate (e.g., 2X) associated with each latch (i.e., L1) and adapted when enabled to set said latch, and means responsive to said output current exceeding said triggering level in the positive (TLU) and negative (TLL) directions respectively for sequentially enabling said positive group steering logic gates (1X, 1Y, 1Z) and said negative group steering logic gates (2X, 2Y, 2Z).

22. In the combination of claim 3 and including voltage sensor means (PGX) for indicating the desired polarity of current in said output lead, and start circuit gate means (6A, 6B) responsive to the magnitude of said output current being less than said triggering level for deriving said positive current signal (+I) and for deriving said negative current signal (−I) respectively when said voltage sensor means (PGX) indicates that said output current should be positive and that said output current should be negative.

23. In the combination of claim 22 and including means (PCS, NCS, 4A, 5B) coupled to said current sensor means for disabling said start circuit gate means when the magnitude of said output current exceeds said predetermined triggering level.

24. In the combination of claim 9 and including voltage sensor means (PGX) for indicating the desired polarity of current in said output lead, start circuit gate means (6A, 6B) responsive to the magnitude of said output current being less than said triggering level for deriving said positive current signal (+I) and for deriving said negative current signal (−I) respectively when said voltage sensor means (PGX) indicates that said output current should be positive and that said output current should be negative, means (PCS, NCS, 4A, 5B) coupled to said current sensor means for disabling said start current gate means when said output current exceeds said predetermined triggering level, and means (N1, N2, N3, 4B, 5D) for disabling said start circuit means when any one latch is set.

25. In the combination of claim 16 and including means responsive to the setting of each said latch to disable the steering logic gates associated with the latch which was concurrently reset.

26. In the combination of claim 1 wherein said firing circuit means includes a plurality of latches (L1, L2, L3) each of which is adapted to be alternatley set and reset and is associated with a pair of SCR's (e.g., 1C and 2C for L1) coupled to the same phase of said supply source with one SCR of said pair in said positive group and the other in said negative group, and means for interlocking said latches so that only one latch at a time can be set and so that they can only be set in a predetermined sequence.

27. In the combination of claim 26 wherein said firing circuit means also includes a positive group control gate (e.g., 1CG) and a negative group control gate (e.g., 2CG) associated with each latch (e.g., L1) for transmitting gating signals to said positive group SCR (e.g., 1C) and negative group SCR (e.g., 2C) associated with said latch when said latch is set, means responsive to the magnitude of said output current exceeding said triggering level in the positive and negative directions respectively for turning on said positive group control gates and for turning on said negative group control gates, and wherein said means for turning on a pair of SCR's includes means responsive to said output current decreasing to said predetermined triggering level for enabling said positive group control gates and for also enabling said negative group control gates, whereby the pair of SCR's are turned on which are associated with the latch which was set when said output current decreased to said triggering level when approaching the zero axis.

28. In the combination of claim 27 wherein each said positive group control gate is enabled upon receipt of a positive group control signal input (XP) when the associated latch is set and each said negative group control gate is enabled upon receipt of a negative group control signal input (XN) when the associated latch is set, means including a current sensor coupled to said output lead for deriving a positive group control signal when the magnitude of said output current is less than said triggering level or is greater than said triggering level in a positive direction, and means including said current sensor for deriving a negative group control signal when the magnitude of said output current is less than said triggering level or is greater than said triggering level in a negative direction.

29. A cycloconverter comprising, in combination a positive current group of SCR's and a negative current group of SCR's connected in parallel between a polyphase supply source and an output lead with the output side of said positive group connected directly to said output side of said negative group, firing circuit means for supplying gating signals to said SCR's so that said positive and negative groups alternately provide a half cycle of output current in said output lead and including a plurality of positive steering logic gates for sequentially deriving gating signals for the positive group SCR's and a plurality of negative steering logic gates for sequentially deriving gating signals for said negative group SCR's, a plurality of interlocked latches each of which is adapted to be alternately set and reset and is associated with a positive steering logic gate and with a negative steering logic gate and is set when either associated steering logic gate is enabled, means for interlocking said latches so that only one latch at a time can be set and so that they can only be set in a predetermined sequence, a positive group control gate and a negative group control gate associated with each latch adapted when enabled to supply respective gating signals to a positive group SCR and to a negative group SCR coupled to the same phase of said source and adapted to be enabled when the associated latch is set and a group control signal input is received, means including a current sensor coupled to said output lead for deriving a positive current signal (+I) when said output current exceeds a predetermined triggering level in a positive direction and for deriving a negative current signal (−I) when said output current exceeds said triggering level in a negative direction, means controlled by said positive current signal for permitting enabling of said positive steering logic gates and inhibiting enabling of said negative steering logic gates and being controlled by said negative current signal for permitting enabling of said negative steering logic gates and for inhibiting enabling of said positive steering logic gates, means responsive to the absence of said positive current signal for applying a group control signal to said negative group control gates, and means responsive to the absence of said negative current signal for applying a group control signal to said positive group control gates, whereby a pair of SCR's coupled to the same phase of said source is turned on each time said output current crosses the zero axis.

30. In the combination of claim 29 wherein said means for permitting and inhibiting enabling of said steering logic gates includes timer means for providing a time delay between said output current exceeding said triggering level and operation thereof to permit enabling of said steering logic gates.

31. In combination, a cycloconverter comprising a positive current group (PX) of SCR's and a negative current group (NX) of SCR's connected in parallel between a polyphase supply source and an output lead with the output side of said positive group connected directly to the output side of said negative group, firing circuit means including a plurality of positive group control gates (1CG, 1BG, 1AG) and a plurality of negative group control gates (2CG, 2BG, 2AG) for supplying gating signals to said SCR's so that said positive and negative groups alternately provide a half cycle of AC output current in said output lead, means responsive to an output current decreasing to a predetermined triggering level when approaching the zero axis in either the positive-going or negative-going direction for turning on a pair of SCR's connected to the same phase of said source with one SCR of said pair being in each of said groups and including current sensor means (HGX) coupled to said output load for deriving a positive current signal (+I) when said output current is positive and exceeds said triggering level and for deriving a negative current signal (−I) when said output current is negative and exceeds said triggering level, means (10C, 10D) responsive to said positive current signal (+I) and to said negative current signal (−I) respectively for deriving an enabling signal (XN) for said positive group control gates and for deriving an enabling signal (XP) for said negative group control gates, and being responsive to the absence of both said positive current signal and said negative current signal to derive both said enabling signal for said positive group control gates and said enabling signal for said negative group control gates, whereby both said positive group control gates and said negative group control gates can be enabled when said output current is less than said triggering level in crossing the zero axis.

32. In the combination of claim 31 wherein said firing circuit means includes a plurality of positive steering logic gates (1X, 1Y, 1Z) for transmitting said gating signals to said SCR's of said positive group and a plurality of negative steering logic gates (2X, 2Y, 2Z) for transmitting said gating signals to said SCR's of said negative group, and means responsive to the magnitude of said output current decreasing to said triggering level when approaching the zero axis in either positive-going or negative-going direction for disabling said firing circuit means including means (3A, 10A) responsive to said positive current signal (+I) for deriving a positive steering signal (YP), said positive steering logic gates being controlled by said positive steering signal (YP); and means (3C, 10B) responsive to said negative current signal (−I) for deriving a negative steering signal, said negative steering logic gates being controlled by said negative steering signal, whereby no gating signals are transmitted to said SCR's when said output current is less than said predetermined triggering level.

33. In the combination of claim 32 wherein said means for turning on a pair of SCR's includes a plurality of latches (L1, L2, L3) between said steering logic gates and said group control gates each of which is adapted to be alternately set and reset and is associated with a positive steering logic gate (e.g., 1X) and a negative steering logic gate (e.g., 2X) and is set in response to the enabling of either steering logic gate, each said latch also being associated with a positive group control gate (1CG) and a negative group control gate (2CG) which control a positive group SCR (1C) and a negative group SCR (2C) coupled to the same phase of said supply source, said positive group control gate (1CG) being enabled when the associated latch (L1) is set and said positive group enabling signal (XP) is present and said negative group control gate (2CG) being enabled when the associated latch is set and said negative group enabling signal (XN) is present, and means for interlocking said latches so that only one latch at a time can be set and so that they can only be set in a predetermined sequence.

34. In the combination of claim 33 wherein said means for deriving a positive current (+I) signal and a negative current (−I) signal derives one of said signals (e.g., +I) when said output current exceeds said triggering level subsequent to turning on said pair of SCR's, and said group control gate enabling signal deriving means is responsive to said one current signal (+I) to remove said group enabling signal (XP) of opposite polarity to said output current so that the one SCR of said pair of SCR's supplying current of opposite polarity to said output current is commutated off.

35. In the combination of claim 34 having means for re-enabling said firing circuit means after said one SCR is commutated including monostable multivibrator means (MONO, 3B) having first (logic 1) and second (logic 0) states and providing a time delay in transferring from said second (0) to said first state (1), means (3A, 3C) responsive to said second state of said multivibrator for preventing generation of said positive and negative steering signals (YP, YN), and logic gate means (11B, 3D, 11C) receiving said positive current signal (+I) and said negative current signal (−I) as inputs for transferring said multivibrator (MONO, 3B) to said second state when both said input signals (+I, −I) are absent and for permitting it to transfer to said first state after said time delay when either input signal is again present, whereby said time delay permits commutation of said one SCR before gating signals are again applied to said SCR's.

* * * * *